United States Patent
Sakurai et al.

(10) Patent No.: US 8,587,926 B2
(45) Date of Patent: Nov. 19, 2013

(54) LITHIUM ION STORAGE DEVICE

(75) Inventors: Atsushi Sakurai, Saitama (JP); Hideaki Uehara, Ibaraki (JP); Yukio Iida, Saitama (JP); Yoshimi Wakamatsu, Saitama (JP); Haruki Hoshi, Saitama (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 264 days.

(21) Appl. No.: 13/047,345

(22) Filed: Mar. 14, 2011

(65) Prior Publication Data

US 2012/0081839 A1    Apr. 5, 2012

(30) Foreign Application Priority Data

Oct. 1, 2010    (JP) .................................. 2010-224195

(51) Int. Cl.
*H01G 9/00*    (2006.01)
*H01G 4/32*    (2006.01)

(52) U.S. Cl.
USPC ............................ 361/502; 361/508; 361/511

(58) Field of Classification Search
USPC .......................................... 361/502, 509, 511
See application file for complete search history.

(56) References Cited

U.S. PATENT DOCUMENTS

| | | | | |
|---|---|---|---|---|
| 6,461,769 | B1 * | 10/2002 | Ando et al. .............. | 429/231.95 |
| 2009/0147442 | A1 * | 6/2009 | Hiroi et al. .................... | 361/502 |
| 2009/0246626 | A1 * | 10/2009 | Tasaki et al. .................. | 429/208 |

FOREIGN PATENT DOCUMENTS

JP    2010-212266 A    9/2010

* cited by examiner

*Primary Examiner* — Jayprakash N Gandhi
*Assistant Examiner* — Dion Ferguson
(74) *Attorney, Agent, or Firm* — Crowell & Moring LLP

(57) ABSTRACT

A present invention provide a lithium ion storage device capable of reliably doping a negative active material of a negative plate with lithium ions generated through dissolution of a lithium metal plate disposed in an electrode group. A conductive shielding member includes a current collecting metal foil and a negative active material layer formed on at least one surface of the current collecting metal foil. The conductive shielding member is provided between a lithium metal plate and a positive plate such that the lithium metal plate is sandwiched between the negative plate and the negative active material layer formed on the current collecting metal foil of the conductive shielding member.

7 Claims, 4 Drawing Sheets

LITHIUM ION STORAGE DEVICE

BACKGROUND OF THE INVENTION

1. Field of the Invention

The present invention relates to a lithium ion storage device.

2. Description of the Related Art

Lithium ion storage devices such as lithium ion capacitors and lithium ion batteries advantageously have a high energy density, a low self-discharge rate, and good cycle performance. Therefore, in recent years, it has been expected to increase the size and the capacity of non-aqueous electrolyte storage devices to use such storage devices as power sources for automobiles such as hybrid vehicles and electric vehicles. In some lithium ion storage devices, a negative plate is doped with lithium ions in advance (lithium pre-doping) to expand the voltage range of use and to increase the capacity.

One method for doping a negative plate with lithium ions in advance is, for example, to place a lithium metal plate in an electrode group before doping, dissolve the lithium metal plate to generate lithium ions, and dope a negative active material of the negative plate with the generated lithium ions. However, if the folded lithium metal plate is wound in an electrode group, a part of the lithium metal plate may pierce a separator to contact a positive plate, which may cause a short circuit between the lithium metal plate and the positive plate.

In a conventional lithium ion storage device as disclosed in Japanese Patent Application Publication No. 2010-212266 (JP2010-212266A) a lithium metal plate is held on a metal foil which is a conductive shielding member to prepare a layered member. A positive plate is divided into two pieces, which are arranged with a predetermined gap therebetween. The layered member holding the lithium metal plate is disposed at a position corresponding to the gap between the two positive plate pieces. That is, the layered member is disposed at a position not facing the two positive plate pieces.

In the conventional structure, the two positive plate pieces are disposed with a predetermined gap therebetween, that is the lithium metal plate is disposed between the positive plate pieces or at a position not facing the positive plate pieces, a portion of the lithium metal plate will not pierce or pass through the separator and will not contact the positive plate pieces, thereby preventing short circuit between the lithium metal plate and the positive plate. However, it is difficult to dispose the lithium metal plate at a position not facing the two positive plate pieces. In addition, burrs produced at cut end surfaces of the two divided positive plate pieces may pierce the separator to contact the negative plate, which may cause a short circuit.

SUMMARY OF THE INVENTION

An object of the present invention is to provide a lithium ion storage device including a lithium metal plate that will not pierce or pass through a separator to contact a positive plate.

Another object of the present invention is to provide a lithium ion storage device in which a negative active material of a negative plate may securely be doped with lithium ions generated by dissolving a lithium metal plate disposed in an electrode group.

A lithium ion storage device, of which improvements are aimed at by the present invention, comprises an electrode group, a thin lithium metal plate, and a conductive shielding member. The electrode group includes a negative plate having a negative active material layer, a positive plate, and a separator disposed between the negative plate and the positive plate. The thin lithium metal plate is directly or indirectly disposed on the negative plate. The conductive shielding member is disposed between the thin lithium metal plate and the positive plate, and electrically connected to the negative plate. The conductive shielding member prevents the thin lithium metal plate from directly facing the positive plate via the separator. The thin lithium metal plate does not exist any longer after the negative active material layer of the negative plate is doped with lithium ions. In the present invention, in particular, the conductive shielding member may comprise a current collecting metal foil and a negative active material layer formed on at least one surface of the current collecting metal foil. In such configuration, the conductive shielding member including the negative active material layer exists between the thin lithium metal plate and the positive plate. Then, most of the lithium ions generated through dissolution of the thin lithium metal plate are doped into the negative active material of the negative plate and the negative active material layer formed on the current collecting metal foil. Therefore, according to the present invention, it is not necessary to divide the positive plate into two pieces as in the conventional device. The lithium ions doped into the negative active material layer of the conductive shielding member have the same effect as the lithium ions doped into the negative active material layer of the negative plate. In the present invention, moreover, since the positive plate is not divided into two pieces to make a gap therebetween, the amount of the positive active material is not reduced. As the result, according to the present invention, the amount of the negative active material of the lithium ion storage device may be increased and a desired usable voltage range or a desired storage capacity may be obtained.

Preferably, the conductive shielding member may include the negative active material layer on one surface of the current collecting metal foil. In this case, the thin lithium metal plate is affixed to the other surface of the current collecting metal foil. This configuration facilitates affixing the lithium metal plate. This configuration also reduces the number of working processes for manufacturing the conductive shielding member and shortens the working time, compared to when the negative active material layer is formed on both surfaces of the current collecting metal foil. Further, this configuration may make the resulting lithium ion storage device inexpensive. It is a matter of course that the negative active material layer may be formed on both surfaces of the current collecting metal foil.

The conductive shielding member may have the same structure as the negative plate. With this configuration, the conductive shielding member can be prepared by cutting the existing material for the negative plate into a piece with an appropriate length. In addition, this configuration may eliminate the need to prepare a new material for the conductive shielding member. Therefore, it is possible to easily manufacture the conductive shielding member, and hence to manufacture the lithium ion storage device at a low cost.

The thin lithium metal plate may arbitrarily be disposed. For example, the thin lithium metal plate may be directly affixed to the negative plate. In this case, the thin lithium metal plate may be directly affixed to the negative plate by pressure bonding utilizing the nature of the thin lithium metal plate to become sticky when a pressure is applied. This configuration makes it possible to reduce the number of component parts and the number of working processes, and to manufacture the lithium ion storage device at a low cost.

The thin lithium metal plate may more readily adhere to a perforated copper foil than to the negative active material applied to the negative plate. Thus, if it is not easy to position the thin lithium metal plate, the thin lithium metal plate may be placed on the negative plate via a perforated copper foil. According to this configuration, the thin lithium metal plate can be easily positioned.

The conductive shielding member may be structured such that the negative active material layer is formed on one surface of the current collecting metal foil and the thin lithium metal plate is affixed to a first half area of the other surface of the current collecting metal foil. The conductive shielding member may be folded such that a second half area of the other surface of the current collecting metal foil covers the thin lithium metal plate. The folded conductive shielding member with the thin lithium metal plate may be disposed in the electrode group. With this configuration, the current collecting metal foil covers both surfaces of the thin lithium metal plate. As a result, it is easy to affix the lithium metal plate, thereby improving the productivity of the lithium ion storage device. In addition, it is only necessary to provide the negative active material on one surface of the current collecting metal foil. Thus, the lithium ion storage device can be manufactured at a low cost.

The conductive shielding member, which is formed by forming the negative active material layer on one surface of the current collecting metal foil, may be used in an unfolded state. In this case, the thin lithium metal plate may be affixed to the other surface of the current collecting metal foil. Then, the conductive shielding member may be disposed in the electrode group with the other surface of the current collecting metal foil facing toward the negative plate. This configuration causes the effect of increasing the capacity compared to the aforementioned configuration of the conductive shielding member.

DESCRIPTION OF THE PREFERRED EMBODIMENTS

Figure 1:
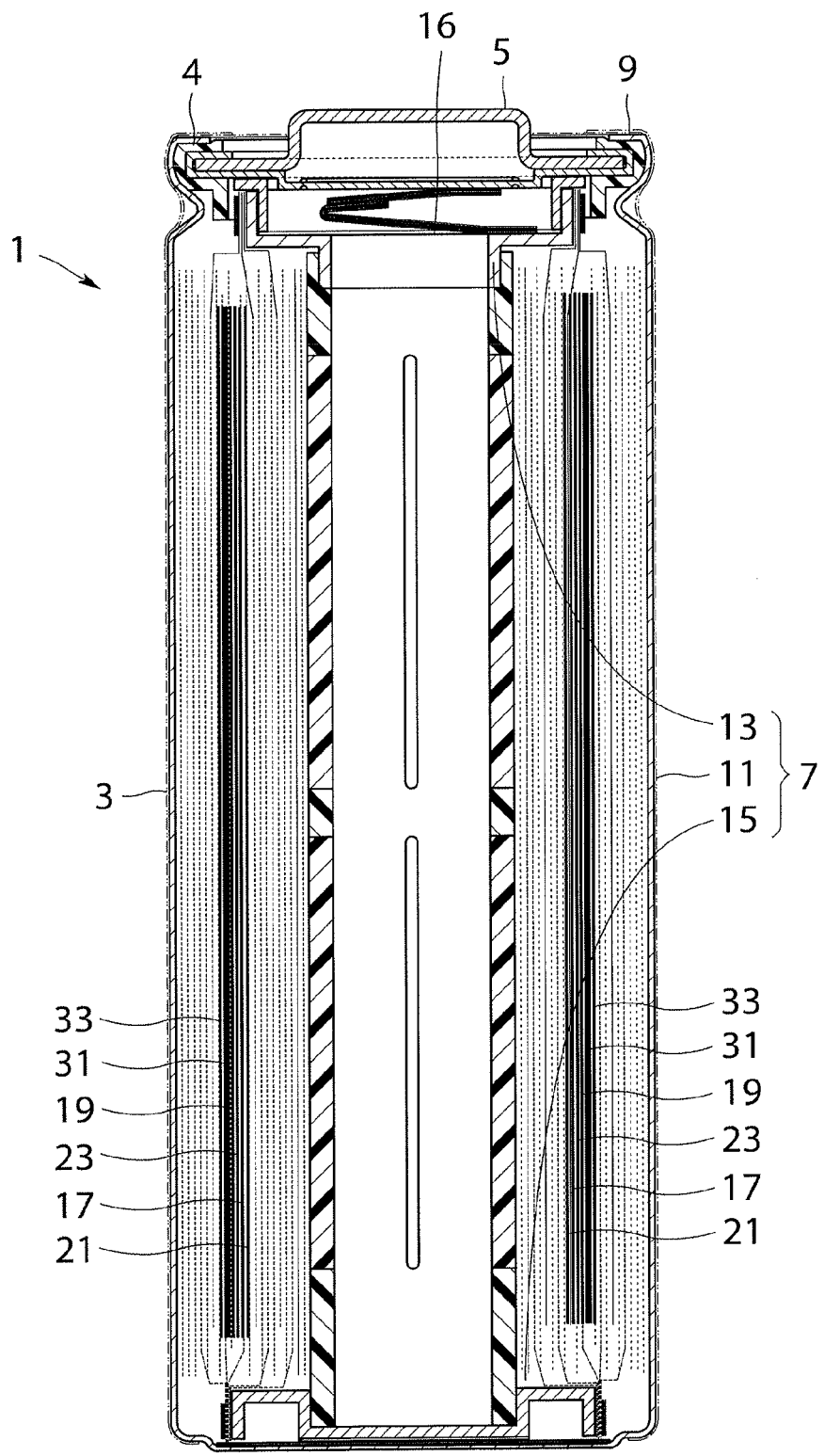
FIG. 1 is a partial cross-sectional view of a lithium ion capacitor according to a first embodiment of the present invention.

Embodiments of the present invention will be described in detail below with reference to the drawings. FIG. 1 is a cross-sectional view of a cylindrical lithium ion capacitor according to a first embodiment of the present invention taken along the longitudinal direction. In FIG. 1, some of the constituent members of the lithium ion capacitor are not shown. A cylindrical lithium ion capacitor 1 according to the embodiment includes a container body 3, a lid member 5, and an electrode group unit 7. The container body 3 is made of a nickel-plated steel material, and has the shape of a bottomed cylinder with one open end portion. An opening portion 4 of the container body 3 is closed by the lid member 5. The lid member 5 is swaged in the open end portion of the container body 3 via a gasket 9 made of a rubber or a resin having insulation and heat-resistance properties. Therefore, the internal space of the capacitor 1 is hermetically sealed. An non-aqueous electrolyte (not shown) is poured into the capacitor 1. An amount of a non-aqueous electrolyte is enough to infiltrate the entirety of an electrode group 11 of the electrode group unit 7. In the embodiment, a solution obtained by dissolving lithium hexafluorophosphate ($LiPF_6$) as an electrolyte in a single solvent such as ethylene carbonate, dimethyl carbonate, diethyl carbonate, or polypropylene carbonate may be used as the non-aqueous electrolyte. Also, a solution obtained by dissolving lithium hexafluorophosphate ($LiPF_6$) as an electrolyte in a mixed solvent of ethylene carbonate, dimethyl carbonate, and diethyl carbonate may be used as the non-aqueous electrolyte. The electrode group unit 7 includes the electrode group 11, a positive current collecting member 13, and a negative current collecting member 15. In FIG. 1, in order to facilitate understanding, some members of the lithium ion capacitor 1 are illustrated with exaggeration in terms of dimensions.

Figure 2A:
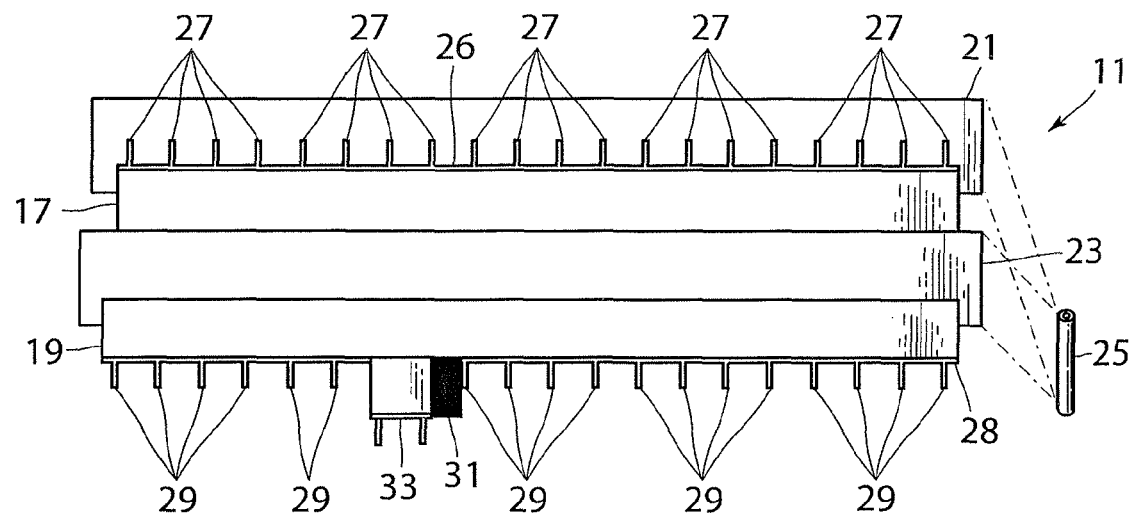
FIG. 2A schematically shows an electrode group according to the first embodiment before being wound.
Figure 2B:
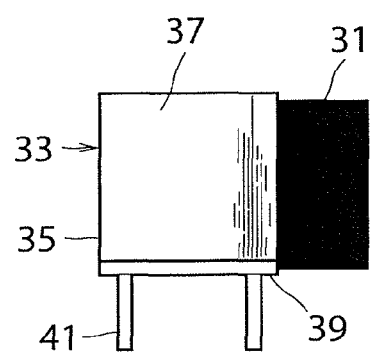
FIG. 2B shows a part of the electrode group as enlarged.

FIG. 2A schematically shows the electrode group 11 before being wound. FIG. 2B shows a lithium metal plate 31 and a conductive shielding member 33 as enlarged. As shown in FIG. 2A, the electrode group 11 is formed into a swirling shape by winding an elongated positive plate 17 and an elongated negative plate 19 via two separators 21 and 23 about a hollow cylindrical axial core 25.

In the embodiment, the lithium metal plate 31 and the conductive shielding member 33 shown in FIG. 2B are wound together with the positive plate 17, the negative plate 19, and the two separators 21 and 23 when the electrode group 11 is wound.

The positive plate 17 comprises an aluminum foil serving as a positive current collector plate and a positive active material layers formed on both surfaces of the aluminum foil. The positive active material layers are formed by substantially uniformly applying a positive mixture containing activated carbon to both surfaces of the aluminum foil. An uncoated portion 26, to which no positive mixture is applied, is formed on one side of the aluminum foil along the longitudinal direction thereof. The uncoated portion 26 has been cut into a comb-like shape, and the remaining uncut portions of the uncoated portion 26 form a plurality of positive electrode lead lugs or pieces, namely tabs 27 of the positive plate 17. The plurality of tabs 27 are connected to the positive current collecting member 13 by welding.

The negative plate 19 comprises an electrolytic copper foil or a rolled copper foil serving as a negative current collector plate and negative active material layers formed on both surfaces of the electrolytic copper foil or the rolled copper foil. The negative active material layers are formed by substantially uniformly applying a negative mixture containing carbon powder capable of occluding and releasing lithium ions as a negative active material to both surfaces of the electrolytic copper foil or the rolled copper foil. An uncoated portion 28, to which no negative mixture is applied, is formed on one side of the copper foil along the longitudinal direction thereof. The uncoated portion 28 has been cut into a comb-like shape, and the remaining uncut portions of the uncoated portion 28 form a plurality of negative electrode lead lugs or pieces, namely tabs 29 of the negative plate 19. The tabs 29 of the negative plate 19 are located on an opposite side to the side of the positive plate 17 on which the tabs 27 are located. The tabs 29 are connected to the negative current collecting member 15 by welding. (In FIG. 1, the plurality of tabs 27 of the positive plate 17 are positioned on the side of the lid member 5. The plurality of tabs 29 of the negative plate 19 are positioned on the side of the bottom portion of the container body 3.

The lithium metal plate 31 is disposed on one surface of the negative plate 19. The lithium metal plate 31 becomes sticky when a pressure is applied thereto. Thus, in the embodiment, the lithium metal plate 31 is directly affixed to the negative plate 19 by pressure bonding. The conductive shielding member 33 formed in a generally rectangular shape is disposed on the lithium metal plate 31. It is a matter of course that the lithium metal plate 31 may be affixed to the conductive shielding member 33 and the conductive shielding member 33 with the lithium metal plate may then be disposed on the negative plate 19. The conductive shielding member 33 includes a current collecting metal foil 35 formed by an electrolytic copper foil or a rolled copper foil and a negative active material layer 37 formed on one surface of the current collecting metal foil 35. The negative active material layer 37 is formed by substantially uniformly applying a negative mixture containing carbon powder capable of occluding and releasing lithium ions to the one surface of the current collecting metal foil 35. In the conductive shielding member 33, the negative active material layer may be formed by substantially uniformly applying a negative mixture containing carbon powder capable of occluding and releasing lithium ions to both surfaces of an electrolytic copper foil or a rolled copper foil. In this case, the conductive shielding member 33 has the same configuration as the negative plate 19. An uncoated portion 39, to which no negative mixture is applied, is formed along one side of the current collecting metal foil 35. The uncoated portion 39 has been cut into a comb-like shape, and the remaining uncut portions of the uncoated portion 39 form a plurality of conductive shielding member lead lugs or pieces, namely tabs 41 of the conductive shielding member 33. The plurality of tabs 41 are positioned on the side of the bottom portion of the container body 3. The tabs 41 are connected to the negative current collecting member 15 by welding as with the tabs 29 of the negative plate 19.

The conductive shielding member 33 has a size that is enough to cover the entire lithium metal plate 31. This configuration allows the lithium metal plate 31 to be disposed in the electrode group 11 such that the lithium metal plate 31 is sandwiched between the negative plate 19 and the conductive shielding member 33. As a result, the conductive shielding member 33 and the separator 21 are interposed between the lithium metal plate 31 and the positive plate 17.

The separators 21 and 23 are formed using a porous base material such as kraft paper. In the embodiment, the outer peripheral surface of the electrode group 11 is covered by an end portion of the separator 21 or 23. The end portion of the separator 21 or 23 is fixed by an adhesive tape (not shown) to prevent unwinding. The axial core 25 is formed from a resin such as polyphenylene sulfide or polypropylene.

The positive current collecting member 13 made of aluminum and having a ring shape is disposed between the lid member 5 and an end portion of the electrode group 11 adjacent to the end portion of the electrode group 11. The tabs 27 are connected to the positive current collecting member 13 to collect a current from the positive plate 17. The positive current collecting member 13 is fitted with the upper end portion of the axial core 25. The distal end portions of the tabs 27 of the positive electrode 17 are joined to the outer peripheral surface of an annular portion of the positive current collecting member 13 by laser welding, ultrasonic welding, or the like. The annular portion is unitarily formed with the positive current collecting member 13 so as to extend from the periphery of the positive current collecting member 13. The negative current collecting member 15 made of copper is disposed between the bottom portion of the container body 3 and an end portion of the electrode group 11 adjacent to the end portion of the electrode group 11. The tabs 29 of the negative plate 19 and the tabs 41 of the conductive shielding member 33 are connected to the negative current collecting member 15. The lower end portion of the axial core 25 is fitted with the inner peripheral surface of the negative current collecting member 15. The distal end portions of the tabs 29 of the negative plate 19 and the tabs 41 of the conductive shielding member 33 are joined to the outer periphery of the negative current collecting member 15 by laser welding, ultrasonic welding, or the like.

An insulating coating (not shown) is applied to the entire peripheral surface of the positive current collecting member 13. Specifically, the insulating coating is formed by winding an adhesive tape in one or more plies from the peripheral surface of the positive current collecting member 13 to the outer peripheral surface of the electrode group unit 7. For example, the adhesive tape may comprise a base material made of polyimide, polyphenylene sulfide, or the like and an acrylate-based adhesive which is applied to one surface of the base material. The electrode group unit 7 is inserted into the container body 3. The lower portion of the negative current collecting member 15 is formed in the shape of a bottomed cylinder. The negative current collecting member 15 is joined to the container body 3 by joining the bottom portion of the negative current collecting member 15 and the container body 3 to each other by resistance welding.

Next, a method of assembling the cylindrical lithium ion capacitor according to the embodiment will be described. In the embodiment, first, a predetermined amount of a non-aqueous electrolyte is poured into the container body 3 utilizing the internal space of the axial core 25. In order to ensure the working safety, the non-aqueous electrolyte is preferably poured in an environment at a controlled temperature and a low humidity. A plurality of slits may be formed in a side surface portion of the axial core 25 or at the distal end of the axial core 25 on the side of the negative current collecting member 15. In this case, the non-aqueous electrolyte infiltrates the container body 3 via the plurality of slits. Next, the opening portion of the container body 3 is closed by the lid member 5 with a positive electrode lead plate 16 folded. Then, the lid member 5 is swaged via the resin gasket 9 for tight sealing.

Next, a method for doping the negative active material of the lithium metal plate 31 according to the embodiment will be described. In the embodiment, the fabricated cylindrical lithium ion capacitor 1 is stored in a storage room controlled at a predetermined temperature (for example, room temperature) for a predetermined period (for example, two to four weeks). The tabs 41 of the conductive shielding member 33 are joined to the negative current collecting member 15 together with the tabs 29 of the negative plate 19. Therefore, the lithium metal plate 31 is dissolved to generate lithium ions because of the potential difference between the potential of the negative electrode and the potential of the lithium while the lithium ion capacitor 1 is left to stand. The lithium ions generated through dissolution are doped into the negative active material of the negative plate 19. When the doping is finished, the lithium metal plate 31 has all been dissolved and thus does not exist any longer. Only the conductive shielding member 33 remains. As a result, in the embodiment, it is possible to reliably obtain a lithium ion capacitor with a desired voltage range of use or a desired capacity.

Figure 3A:
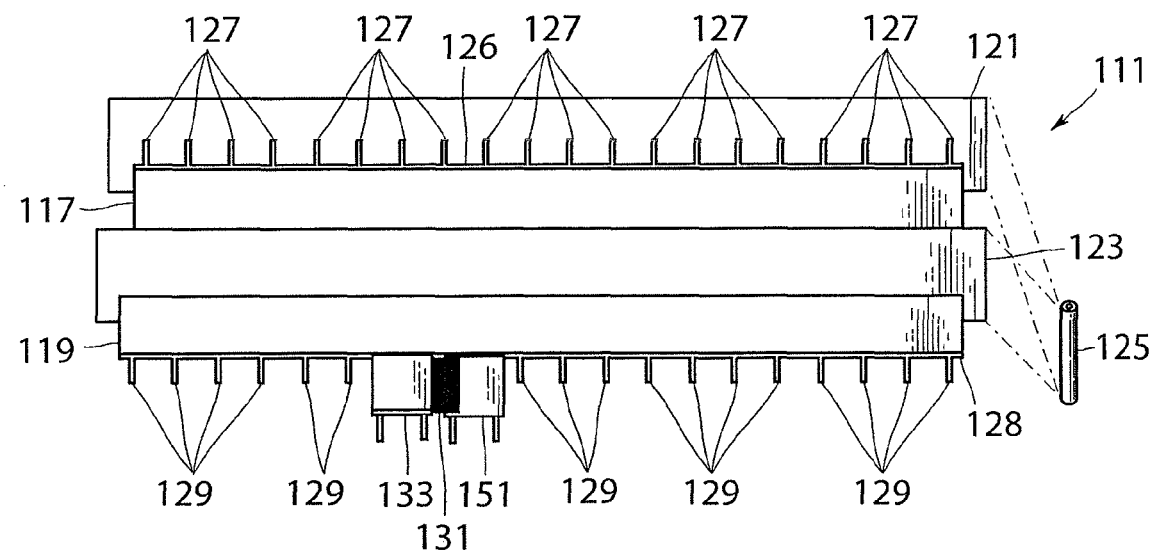
FIG. 3A schematically shows an electrode group according to a second embodiment before being wound.
Figure 3B:
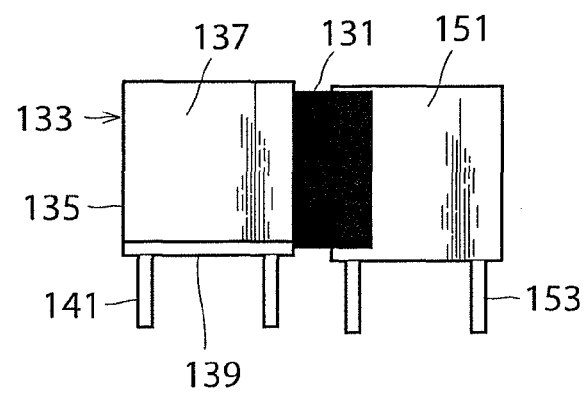
FIG. 3B shows a part of the electrode group as enlarged.

FIG. 3A schematically shows an electrode group 111 before being wound, which is used in a cylindrical lithium ion capacitor according to a second embodiment of the present invention. FIG. 3B shows a lithium metal plate 131, a conductive shielding member 133, and a perforated copper foil 151, which are disposed in the electrode group 111, as enlarged. In FIGS. 3A and 3B, component parts that are similar to those shown in FIGS. 1, 2A, and 2B are denoted by reference numerals obtained by adding 100 to the reference numerals affixed to their counterparts in FIGS. 1, 2A, and 2B to omit detailed descriptions.

In the electrode group 111 used in the cylindrical lithium ion capacitor according to the second embodiment, as shown in FIGS. 3A and 3B, the lithium metal plate 131 is not directly affixed to a negative plate 119, and the lithium metal plate 131 is indirectly disposed on the negative plate 119 via the perforated copper foil 151. The perforated copper foil 151 used in the embodiment is formed to have substantially the same size as the conductive shielding member 133. The perforated copper foil 151 includes tabs 153 formed on one side thereof that faces the side with the tabs 139 of the conductive shielding member 133. The tabs 153 of the perforated copper foil 151 are joined to the negative current collecting member by welding. The lithium metal plate 131 may more readily adhere to the perforated copper foil 151 than to the negative active material of the negative plate 119. Thus, according to the embodiment, the lithium metal plate 131 can be easily positioned compared to the case where the lithium metal plate 131 is directly affixed to the negative plate 119. The lithium metal plate 131 is disposed in the electrode group 11 such that the lithium metal plate 131 is sandwiched between the conductive shielding member 133 and the perforated copper foil 151. As a result, the lithium metal plate 131 is positively dissolved from both surfaces during doping of the negative active material.

Figure 4A:
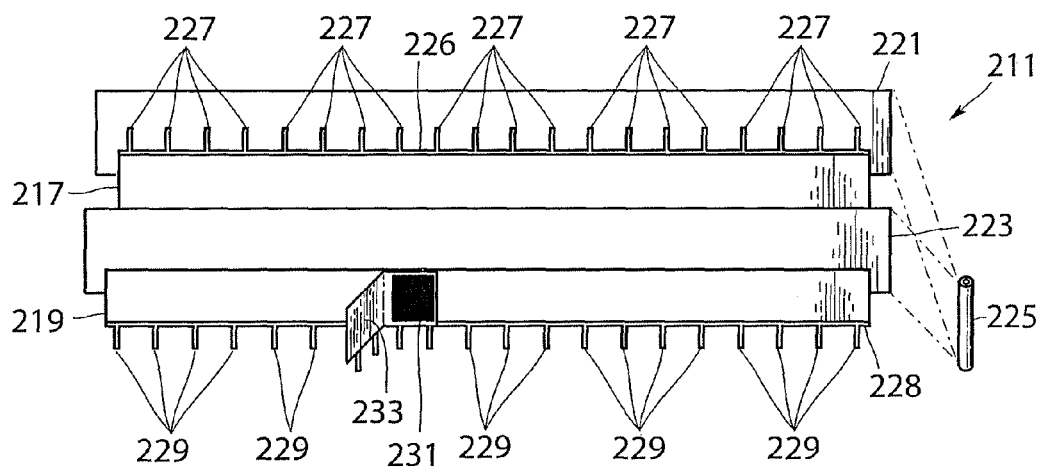
FIG. 4A schematically shows an electrode group according to a third embodiment before being wound.
Figure 4B:
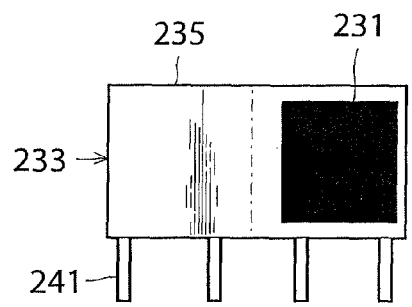
FIG. 4B shows a part of the electrode group as enlarged.

FIG. 4A schematically shows an electrode group 211 before being wound, which is used in a cylindrical lithium ion capacitor according to a third embodiment of the present invention. FIG. 4B shows a lithium metal plate 231 and a conductive shielding member 233, which are disposed in the electrode group 211, as enlarged. In FIGS. 4A and 4B, component parts that are similar to those shown in FIGS. 1, 2A, and 2B are denoted by reference numerals obtained by adding 200 to the reference numerals affixed to their counterparts in FIGS. 1, 2A, and 2B to omit detailed descriptions.

In the cylindrical lithium ion capacitor according to the third embodiment, as shown in FIGS. 4A and 4B, the lithium metal plate 231 is disposed in the electrode group 211 such that the lithium metal plate 231 is sandwiched in the conductive shielding member 233 in a folded state. The conductive shielding member 233 according to the embodiment is configured such that a negative active material layer (not shown) is formed on one surface of a current collecting metal foil 235. The lithium metal plate 231 is affixed to a first half area of the other surface of the current collecting metal foil 235. The conductive shielding member 233 is folded such that a second half area of the other surface of the current collecting metal foil 235 covers the lithium metal plate 231. According to the configuration of the embodiment, the second half area of the other surface of the current collecting metal foil 235 covers the lithium metal plate 231 when the current collecting metal foil 235 is folded. The lithium metal plate 231 becomes sticky when a pressure is applied. The lithium metal plate 231 is affixed to the second half area of the other surface of the current collecting metal foil 235 when the pressure is applied to the folded the current collecting metal foil 235. The conductive shielding member 233, in which a negative active material layer is formed on one surface of the current collecting metal foil 235, may be used in an unfolded state. In this case, the lithium metal plate is affixed to the other surface of the current collecting metal foil 235. Then, the conductive shielding member is disposed in the electrode group such that the other surface of the current collecting metal foil 235, to which the lithium metal plate is affixed, faces the negative plate.

In the lithium ion capacitor according to each of the embodiments, a solution obtained by dissolving lithium hexafluorophosphate ($LiPF_6$) as an electrolyte in a single solvent such as ethylene carbonate, dimethyl carbonate, diethyl carbonate, or polypropylene carbonate may be used as the non-aqueous electrolyte. Also a solution obtained by dissolving lithium hexafluorophosphate ($LiPF_6$) as an electrolyte in a mixed solvent of ethylene carbonate, dimethyl carbonate, and diethyl carbonate may be used as the non-aqueous electrolyte. However, it is a matter of course that any other non-aqueous electrolyte obtained by dissolving a common lithium salt as an electrolyte in an organic solvent may also be used.

In each of the embodiments, the present invention is applied to a cylindrical lithium ion capacitor. However, it is a matter of course that the present invention may also be applied to lithium ion capacitors of a layered type in which rectangular plates are layered on each other, and to other lithium ion storage devices such as lithium ion batteries.

According to the present invention, the conductive shielding member including the negative active material layer is provided between the thin lithium metal plate and the positive plate. Therefore, most of the lithium ions generated through dissolution of the thin lithium metal plate are doped into the negative active material layer of the negative plate and the negative active material layer provided on the current collecting metal foil. Therefore, since the positive plate is not divided as in the conventional device, the lithium metal plate will not pierce the separator to contact the positive plate, which prevents a short circuit.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A lithium ion storage device comprising:
an electrode group comprising:
a negative plate having a first negative active material layer;
a positive plate; and
a separator disposed between the negative plate and the positive plate;
a thin lithium metal plate directly or indirectly disposed on the negative plate and not existing anymore after the first negative active material layer of the negative plate is doped with lithium ions; and
a conductive shielding member disposed between the thin lithium metal plate and the positive plate and electrically connected to the negative plate, the conductive shielding member hindering the thin lithium metal plate from facing the positive plate via the separator,
wherein the conductive shielding member comprises a current collecting metal foil and a second negative active material layer, formed on at least one surface of the current collecting metal foil.

2. The lithium ion storage device according to claim 1, wherein the conductive shielding member is structured such that:
the second negative active material layer is formed on one surface of the current collecting metal foil; and the thin lithium metal plate is affixed to the other surface of the current collecting metal foil.

3. The lithium ion storage device according to claim 1, wherein the conductive shielding member has the same structure as the negative plate.

4. The lithium ion storage device according to claim 1, wherein
the thin lithium metal plate is directly affixed to the negative plate.

5. The lithium ion storage device according to claim 1, wherein
the thin lithium metal plate is placed on the negative plate via a perforated copper foil.

6. The lithium ion storage device according to claim 1, wherein:
the conductive shielding member is structured such that the second negative active material layer is formed on one surface of the current collecting metal foil and the thin lithium metal plate is affixed to a first half area of the other surface of the current collecting metal foil;
the conductive shielding member is folded such that a second half area of the other surface of the current collecting metal foil covers the thin lithium metal plate; and
the folded conductive shielding member with the thin lithium metal plate is disposed in the electrode group.

7. The lithium ion storage device according to claim 1, wherein:
the conductive shielding member is structured such that the second negative active material layer is formed on one surface of the current collecting metal foil and the thin lithium metal plate is affixed to the other surface of the current collecting metal foil; and
the conductive shielding member is disposed in the electrode group with the other surface of the current collecting metal foil facing toward the negative plate.

* * * * *